METHOD OF FABRICATING PASSIVATED MESA TRANSISTOR
WITHOUT CONTAMINATION OF JUNCTIONS
Filed Sept. 24, 1962
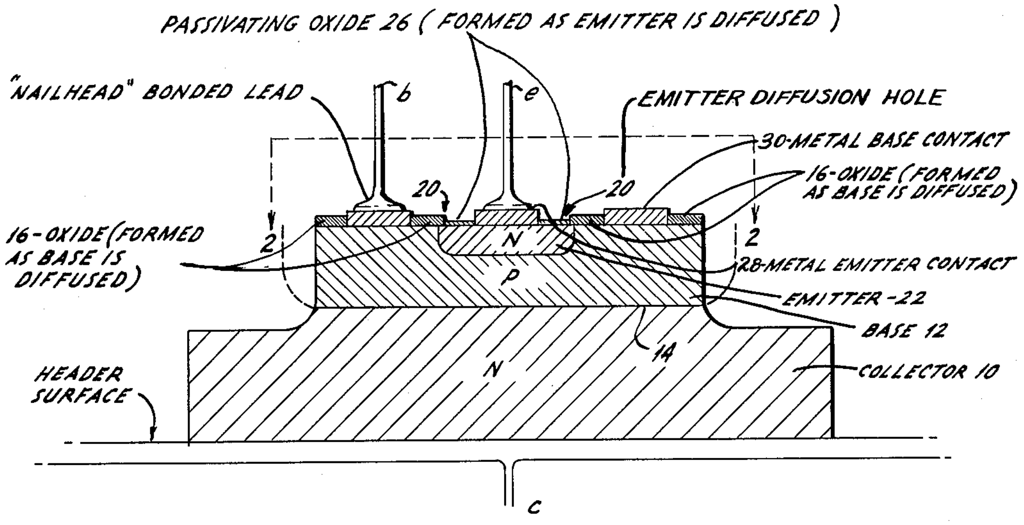
FIG. 1. SECTION OF PASSIVATED MESA TRANSISTOR STRUCTURE
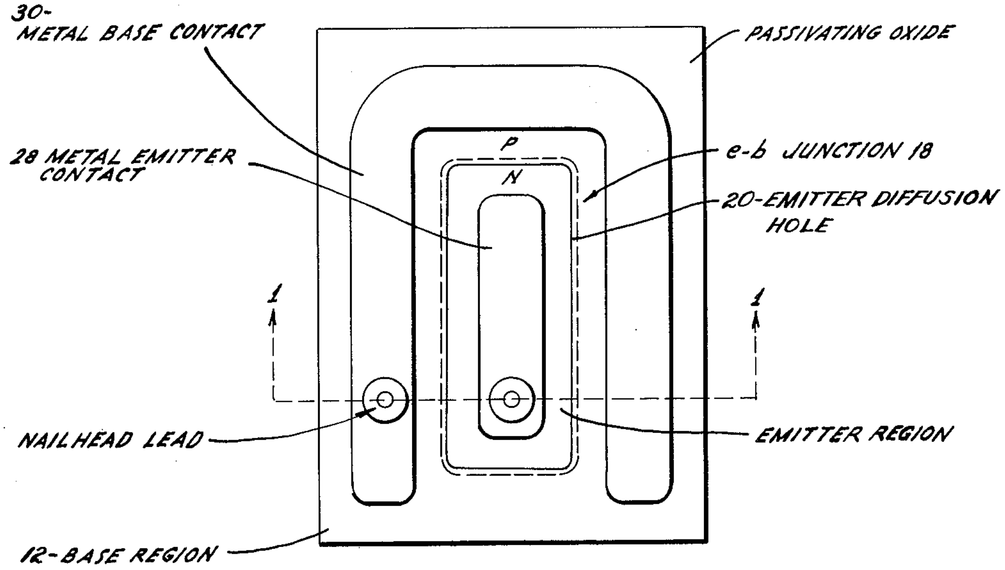
FIG. 2. TYPICAL TOPOGRAPHY OF A PASSIVATED MESA TRANSISTOR (COLLECTOR SECTION OMITTED)
INVENTOR.
CLIFFORD KILE, JR.
BY
Allen V. Hazeltine
ATTORNEY United States Patent Office 3,204,321

Patented Sept. 7, 1965

3,204,321

METHOD OF FABRICATING PASSIVATED MESA TRANSISTOR WITHOUT CONTAMINATION OF JUNCTIONS

Clifford Kile, Jr., Lansdale, Pa., assignor to Philco Corporation, Philadelphia, Pa., a corporation of Delaware Filed Sept. 24, 1962, Ser. No. 225,593
4 Claims. (Cl. 29—25.3)

INTRODUCTION

This invention relates to transistors and more particularly to a mesa type transistor which is uniquely fabricated to contain a passivated (oxide protected) emitter-base junction.

Sophistication of the junction transistor art brought forth the "mesa" transistor—so named because of the geographical plateau it physically resembles. The mesa is noted for its numerous advantage vis-a-vis the "conventional" junction transistor; viz: its extremely small size, its adaptability to large lot mass production, its compatibility with allied technology, its adaptability for processing to yield specific parameters, and its generally high performance including its ability to handle large collector voltages. The mesa is further discussed and depicted at page 1031 of the Proceedings of the IRE for May 1962.

The mesa as heretofore fabricated, however, has demonstrated certain deficiencies in its operation. Foremost among these is an observed high emitter-base leakage current which causes a degradation of $h_{fe}$—the forward current gain from base to collector in the grounded emitter configuration. Certain nonlinearities and operating instabilities have also been observed in the mesa. I have traced these difficulties to a contamination of the emitter-base junction during fabrication, and I have devised a novel and improved method of fabrication of the mesa which obviates said contamination.

OBJECTS

Accordingly, the objects of the instant invention are: (1) to fabricate the mesa transistor in a novel and improved manner, (2) to produce a new and superior mesa transistor, (3) to fabricate the mesa transistor in a way in which contamination of the emitter-base junction is obviated, and (4) to produce a mesa transistor having an improved *e–b* leakage current value, an improved $h_{fe}$ value, and improved linearity and operating stability. Other objects and advantages of the invention will become apparent from a consideration of the following summary, specification, and claims.

SUMMARY

The mesa transistor of the instant invention contains a base-emitter junction which is covered with a passivating oxide. Said oxide is formed partially during or after diffusion of the base, and partially during diffusion of the emitter. Holes are etched through the oxide so that the emitter and base contacts can be deposited on their respective regions. Otherwise conventional mesa processes are employed.

DRAWING

In the drawing:

FIG. 1 depicts a cross section of the mesa transistor of the present invention, and FIG. 2 depicts the surface topography of said transistor.

*Discussion—FIGS. 1 and 2*

FABRICATION

A cross-sectional view of a complete mesa transistor fabricated according to the present invention is shown in FIG. 1 and a top view of the transistor (collector region omitted) is shown in FIG. 2. The improved mesa of FIGS. 1 and 2 is fabricated in a manner which inherently forms a passivating oxide over the b–e (base-emitter) junction.

More particularly the transistor of the present invention may be formed from a clean starting wafer (not shown) of N-type silicon having a thickness equal to the maximum height of the body of the FIG. 1 structure. After diffusion of base and emitter regions into said wafer and formation of respective surface contacts for these regions, as described below, the periphery of the upper portion of the wafer, which is part of the collector and base regions, is etched away to provide a structure having a mesa-shaped cross section as shown in FIG. 1.

More particularly the base region 12 is formed by diffusing gallium (a P-type dopant) into an area of the top surface of the wafer having a size approximately equal to the width of the base region 12 and to a depth indicated by junction 14. Thus prior to the aforementioned mesa-defining etch step, which is described in more detail below, junction 14 will be bowl-shaped as indicated by the upwardly curving dashed lines thereof, and will intersect the top surface of the wafer. This base diffusion may be performed by subjecting the above-described surface area of the wafer to flowing nitrogen gas which is partially saturated with gallium trioxide vapor. During or after this diffusion the wafer is also subjected to steam to grow a passivating layer 16 of silicon dioxide ($SiO_2$) over the base and collector zones at the top surface of the wafer. This oxide is ordinarily made from 5,000 to 15,000 A. thick.

The emitter is formed by first etching a hole 20 through oxide layer 16 slightly smaller than the desired size and shape of the emitter. The wafer is then subjected to a phosphorous pentoxide ($P_2O_5$) diffusion process which forms the emitter 22 and the *e–b* junction 18. Due to the diffusion process the actual *e–b* junction 18 is formed (as shown in exaggerated form) slightly without the edge of the hole 20 which was cut in oxide 16. However as the emitter is formed, another passivating oxide 26 composed of phosphate glass is simultaneously formed by the phosphorous diffusion process over the emitter region and adjacent the partially passivated *e–b* junction. It is theorized that the phosphate glass 26 is formed because the silicon base region, into which $P_2O_5$ is being diffused, reduces the $P_2O_5$ to form phosphorous and $SiO_2$. Oxide 26 cooperates with oxide 16 to completely passivate the *e–b* junction to yield the novel mesa transistor of the present invention. Additional holes are then etched through the oxide according to the shape of the metal base and emitter contacts 28 and 30, which are then bonded to the device by well-known evaporation techniques. These holes are then etched clear of any junctions so that the junctions are never again exposed to any possible contamination.

In practice many hundreds of transistors will be simultaneously formed on the same wafer. Each transistor on the wafer is provided with a dot of wax resist over the surface of its base region. An etch bath is then applied to the wafer long enough to remove the portions of the collector regions laterally adjacent the base regions in order to form mesa structures. The wafer is then scribed and fractured into individual transistors which are mounted on headers. The nailhead leads are attached, after which the transistor is encapsulated in accordance with standard procedure. Epitaxially grown wafers may be used if the transistors are to be used for switching applications where an extremely low saturation voltage is required. The base contact, instead of being a U-shaped strip as shown, may be a concentric ring, a strip parallel to the edges of the device, flanking strips on each side of the emitter, or a series of strips interdigitated with a series of emitter strips.

APPLICATION

Although not limited to such use, the mesa transistor of the instant invention is the first one which was found fully suitable for use as the video output amplifier in a television receiver. A silicon passivated mesa has been successful in delivering 110 volts of peak to peak video with substantial amplitude linearily and good transient response (0.130$\mu$ sec.) from 30 cycles to 3.5 megacycles with a voltage gain of 61 when used as a video amplifier.

The instant invention is not to be limited by the specificities of the foregoing description since many modifications thereof which fall within the true scope of the inventive concept will be apparent to those conversant with the art. The invention is defined only by the appended claims.

I claim:

1. A method of fabricating a mesa transistor with an emitter-base junction which is never exposed to contamination, comprising the steps of:
(a) diffusing a base region into a wafer of collector material,
(b) forming a first oxide on a surface of said wafer including said base region and said collector,
(c) cutting a hole through the portion of said oxide which covers said base region to provide an exposed surface on said wafer,
(d) diffusing an emitter region through said hole in said oxide into said base region using means which simultaneously forms a second oxide on said exposed surface of said wafer, and
(e) etching away the portions of said collector region laterally adjacent said base region to form said mesa structure.

2. The method as recited in claim 1 wherein said wafer is comprised of silicon, said base diffusion is performed with gallium trioxide, and said emitter diffusion is performed with phosphorous pentoxide.

3. A method of fabricating a mesa transistor having a protected emitter-base junction comprising the following steps:
(a) diffusing gallium trioxide into a face of a wafer of silicon to form respective base and collector regions in said wafer,
(b) forming a silicon dioxide protective coating over said face,
(c) photolithographically etching a hole in said coating to expose a portion of said base region,
(d) diffusing phosphorous pentoxide into said base region through said hole to: (1) form an emitter region within said base region whose junction with said base region intersects the surface of said wafer under said oxide coating, and (2) simultaneously form a phosphorus-silicon dioxide coating over the surface of said diffused emitter region,
(e) providing a dot of wax on the surface of said wafer which substantially covers only said emitter and said base,
(f) applying an etch bath to said wafer long enough to remove only the portions of said collector region laterally adjacent said base, and
(g) removing said wax and etching away portions of said oxide within said emitter and base regions, and
(h) bonding metal contacts to said emitter and base regions where said oxide as etched away under step (g), and applying transistor leads to said contacts.

4. A method of fabricating a mesa transistor having an emitter-base junction which is never exposed to contamination, comprising the following steps:
(a) diffusing a region of one conductivity into an area on the surface of a wafer of another conductivity to form base and collector regions in said wafer,
(b) oxidizing said surface of said wafer to form a protective coating thereover,
(c) removing a portion of said protective coating which covers said base region, thereby exposing a portion of the surface of said base region,
(d) diffusing a region of said other conductivity into the exposed surface portion of said base region to form an emitter region within said base region using means which simultaneously forms a protective coating over said exposed portion of said base region, and
(e) removing at least a portion of said collector region which is laterally adjacent said base region to form a mesa structure.

References Cited by the Examiner

UNITED STATES PATENTS

| | | | |
|---|---|---|---|
| 2,794,846 | 6/57 | Fuller | 148—1.5 X |
| 2,930,722 | 3/60 | Ligenza | 148—1.5 |
| 3,025,589 | 3/62 | Hoerni. | |
| 3,040,218 | 6/62 | Byczkowski | 29—25.30 |

OTHER REFERENCES

Publication: Electronics, September 21, 1964, pp. 32–33.

RICHARD H. EANES, Jr., *Primary Examiner.*